United States Patent [19]
Dunsmoor

[11] 3,835,217
[45] Sept. 10, 1974

[54] PROCESS FOR THE RECOVERY OR DISSOLVED MERCURY SALTS FROM AQUEOUS SOLUTIONS

[75] Inventor: Lyle H. Dunsmoor, Point Pleasant, W. Va.

[73] Assignee: PPG Industries, Inc., Pittsburgh, Pa.

[22] Filed: June 1, 1972

[21] Appl. No.: 258,741

Related U.S. Application Data

[63] Continuation-in-part of Ser. No. 105,959, Dec. 21, 1970, abandoned.

[52] U.S. Cl.............. 423/499, 423/101, 423/561, 423/562, 423/629, 423/638, 209/5
[51] Int. Cl............................................. C01d 3/16
[58] Field of Search ........... 423/101, 561, 562, 499, 423/629, 638

[56] References Cited
UNITED STATES PATENTS

| | | | |
|---|---|---|---|
| 2,860,952 | 11/1958 | Bergeron et al. | 423/102 |
| 3,115,389 | 12/1963 | Deriaz | 423/158 |
| 3,718,457 | 2/1973 | Entwisle et al. | 423/562 |

*Primary Examiner*—Edward Stern
*Attorney, Agent, or Firm*—Richard M. Goldman

[57] ABSTRACT

A process for the recovery of mercury sulfide from an aqueous solution comprising intermixing with said solution a flocculating compound of the formula:

$$R_n X_y$$

wherein R is a metal selected from magnesium, manganese, cobalt, nickel, copper, zinc, cadmium, aluminum and calcium, and X is an anion and $n$ and $y$ are integers sufficient to satisfy the valence requirements; preferably at a solution pH of at least about 7 and a temperature of at least about 150°F. for a time sufficient such that preferably less than 25 parts per billion mercury is left in solution.

4 Claims, No Drawings

PROCESS FOR THE RECOVERY OR DISSOLVED MERCURY SALTS FROM AQUEOUS SOLUTIONS

This is a continuation-in-part of U.S. Ser. No. 105,959, filed Dec. 21, 1970, now abandoned.

This invention relates to a process for the removal of mercury from brine and other aqueous solutions such as industrial effluents from mercury cathode electrolytic cell operations or any stream containing mercury and particularly waste streams.

In the operation of a mercury cathode electrolytic cell, a sodium chloride or potassium chloride brine and mercury are passed through a relatively small gap between a fixed anode and a steel plate or other conducting material and the mercury upon entering the cell spreads over the steel plate or other conducting material and acts as a cathode for the cell. A small amount of mercury generally between about 5 and about 7 parts per million is lost and passed out of the cell with the brine effluent or sometimes spilled out of the cell during normal operation. Although it is not generally economical to recover this mercury to reuse it in the electrolytic cell, for ecological reasons it is considered necessary to recover as much as possible of this waste mercury.

A number of methods have been disclosed for recovering this mercury. For example, U.S. Pat. No. 2,860,952 issued to Bergeron et al. treats the dechlorinated brine (at an acid pH) with a soluble sulfide in an amount less than about 100 percent excess based on the mercury in the brine and treats the mixture with a flocculation agent comprising a soluble iron compound and starch; and thereafter adjusts the pH of the mixture by the addition of a basic compound to effect flocculation.

It has now been discovered that a number of other metal salts can be employed and when certain preferred critical conditions are followed the solution can be reduced to a mercury content of less than 25 parts per billion. More particularly, it has been found that after a mercury containing solution such as a mercury-containing brine, is treated with a soluble sulfide and a flocculating amount of a metal salt of the formula $R_nX_y$ wherein R is a metal cation selected from magnesium, manganese, cobalt, nickel, copper, aluminum, zinc, calcium and cadmium; X is an anion, and $n$ and $y$ are integers sufficient to satisfy the valence requirements; the mercury can be precipitated with or without additional alkali depending upon the temperature, pH of the solution and amount of sulfide employed such that less than 1 part per million and preferably 25 parts per billion mercurcy is left in solution.

Suitable anions of the above formula include: the halides such as fluoride, chloride, bromide, iodide; chlorate, perchlorate or nitrate, sulfate, and the like, can be employed. The particular anion is not critical however, it only being necessary that the flocculant is soluble or sparingly soluble (hereinafter referred to as "soluble") so that the cation can form a gelatinous compound in the aqueous solution such as the water insoluble metal hydroxide. The anion is preferably not the perchlorate or chlorate because they can oxidize some of the soluble mercury sulfide. The preferred flocculants are those formed from the metals: aluminum, magnesium, and nickel for the reason that these metals form hydroxides which rapidly flocculate and settle the insoluble mercurcy sulfide to effect substantially complete recovery. The most preferred metal is magnesium and magnesium chloride, the most preferred compound in that it is more effective than the previously employed iron chloride.

Exemplary of suitable flocculants which can be employed in the invention are the following: magnesium chloride, magnesium nitrate, magnesium sulfate ($MgSO_4$), manganese sulfate, manganese bromide, manganese chloride, manganese fluoride, cobalt chloride, cobalt iodide, cobalt nitrate, cobalt sulfate, nickel bromide, nickel perchlorate, nickel chloride, copper bromate, copper bromide ($CuBr_2$), copper chloride, copper nitrate, copper sulfate ($CuSO_4$), aluminum nitrate, aluminum bromate, aluminum bromide, aluminum chlorate, aluminum chloride, aluminum sulfate, zinc bromide, zinc chlorate, zinc perchlorate, zinc chloride, zinc iodide, zinc nitrate, zinc sulfate, calcium bromide, calcium bromate, calcium chlorate, calcium chloride, calcium nitrate, cadmium bromide, cadmium chlorate, cadmium chloride, cadmium nitrate, cadmiumpotassium sulfate and cadmium sulfate.

The solution (alternatively referred to herein as effluent) to be treated is normally primarily an aqueous solution. Where there is some phase separation, however, the mixture can be principally organic or at least comprise a major part thereof providing that the mercury sulfide and flocculant are insoluble therein so that the mercury can be recovered.

The process of the invention is particularly efficacious for alkaline brines from mercury electrolytic cells which comprise an aqueous solution of sodium chloride or potassium chloride generally containing from 50 grams to 100 grams per liter of sodium chloride or potassium chloride. Effluents from said cells and cell operations (i.e., wash waters, spills, seal waters, etc.), however, can contain as little as 5 grams to as much as 300 grams per liter of salt. The brines are normally complex solutions, however, and contain in addition minor amounts of such elements as magnesium, mercury, silicon, calcium, barium, strontium, zinc, iron, manganese, boron, aluminum, lead, tin, chromium, copper, nickel, silver; vanadium, and germanium. In addition, dissolved chlorine or hypochlorite and chlorate ions are normally present. These brines are substantially sulfide free as any sulfide ion reacts with the dissolved chlorine, hypochlorite or chlorate ions. The term "substantially sulfide free" is intended to define any solution in which the materials which react with sulfide ion (e.g., hypochlorite ion) are present in excess, as well as solutions having no sulfide ion.

The sulfur compound employed can be any soluble or sparingly soluble sulfur compound which will provide sulfide ion in the solution. Exemplary of suitable compounds are the alkali metal sulfides such as sodium sulfide, potassium sulfide, and lithium sulfide; the alkaline earth metal sulfides such as magnesium sulfide, calcium sulfide, strontium sulfide, or beryllium sulfide; a hydrosulfide such as sodium hydrosulfide or hydrogen sulfide can be bubbled directly into the solution. Generally the sulfide is added as an aqueous solution but flake materials such as sodium sulfide or sodium hydrosulfide can be used.

The term "mercury sulfide" as used herein means mercuric sulfide, mercurous sulfide, or a mixture thereof. Normally the mercury sulfide is present as mercuric sulfide and thus one mole of sulfide ion per mole of mercury ion would provide a stoichiometric equivalent.

Inasmuch as the solution and particularly brines from a mercury electrolytic cell can contain a number of other materials which are reacted with sulfide ion such as the aforesaid metals, elemental chlorine, hypochlorite, or chlorate ion, the sulfur compound must be added in an amount sufficient to combine or react with said materials and still have an excess of sulfide ion over that required to combine with the mercury present in solution.

Preferably, the soluble chlorine (to include elemental chlorine, hypochlorite, and chlorate ion) normally present in brines is removed from the solution by air oxidation prior to the addition of the sulfide compound.

Unlike the method of Bergeron et al., it has been found that superior results for the process of the invention can be achieved when the sulfide is present in an excess of at least about 100 percent to as much as 500 percent or more when the preferred flocculating compound magnesium chloride is employed and the pH of the solution during the sulfide addition is maintained between about 4 and about 8 and then the pH of the solution preferably raised to between about 10 and about 12 in order to achieve better flocculation.

Thus, the percent excess of sulfide is not critical when the effluent is adjusted to a pH between about 4 and about 8 because the soluble mercury polysulfides are decomposed, which is also aided by air oxidation. In order to avoid the formation of hydrogen sulfide and its liberation into the atmosphere, it is desirable that only a small excess of sulfide be employed. A more preferred method, however, is taught by copending application Ser. No. 100,833, filed Dec. 22, 1970, now U.S. Pat. No. 3,674,428, wherein an excess of sulfide of up to about 500 percent can be employed in an alkaline solution which avoids the formation and liberation of hydrogen sulfide and the soluble polysulfide formed because of excess sulfide can be oxidized, as by exposing the solution to the atmosphere, or by bubbling air into the solution or by employing a chemical oxidizing agent which is sufficiently weak that the insoluble mercury sulfide is not decomposed, whereafter the alkaline solution can be treated with a flocculating compound of the invention and the mercury sulfide precipitate recovered. The amount of sulfide added to the solution will depend upon the pH of the solution although a stoichiometric amount of sulfide necessary to react with the soluble mercury present is always efficacious. Because it is difficult to introduce an exact stoichiometric amount of sulfide, an excess of sulfide is normally employed. When the pH of the solution, however, is up above about 9 or 10, soluble polysulfides of mercury are formed which must be decomposed by oxidation in order to obtain sufficient mercury recovery and thus very littl excess sulfide can be tolerated. At a pH of between about 4 and about 8, a large excess of even 500 percent or more can be employed because the excess sulfide is liberated as hydrogen sulfide but preferably only a small excess is employed if the solution is made neutral or acid in order to avoid the resultant atmospheric pollution or the solution maintained at a pH of at least about 7. At low pH's, the mercury sulfide precipitates very slowly and thus it is desirable to raise the pH to above about 9 and preferably between 10 and 13 so that larger particles will form and so that the mercury sulfide can be easily flocculated.

The soluble flocculating compound of the above formula can be added to the mixture prior to the addition of the soluble sulfide, with the addition of the soluble sulfide, and can be added either before or after the pH of the solution is raised. For optimum results, the flocculant is added after the sulfide addition and after any soluble mercury polysulfide is decomposed. The pH of the solution must be at some time such that the flocculating agent forms insoluble hydroxides and thus for aluminum hydroxide should be between about 4 and about 8 or preferably neutral and for magnesium hydroxide should be alkaline such as between about 9 and about 13 and preferably between about 11 and about 13. Inasmuch as the magnesium salts such as magnesium chloride are very good flocculants and because they form insoluble hydroxide in aqueous solution at the higher pH's where the mercury sulfide is more easily flocculated, these compounds are the preferred compounds of the invention because the effluent need never be made acidic.

Only small amounts of the aforesaid compounds are necessary to flocculate the mercury sulfide. Amounts as small as 1 part by weight of the flocculant per million parts of solution can be employed. Preferably the amounts used are from about 5 to about 20 parts by weight but greater amounts can be employed although no particular benefits accrue. If desired, an additional flocculating agent or settling agent can be employed. When these additional agents are employed, they can be employed in approximately the same amounts as the aforesaid flocculants and include, for example, starch and gum arabic.

The pH of the solution can be raised by the addition of an alkali metal hydroxide, alkaline earth metal hydroxide, carbonate, or the like. The pH of the solution can be lowered by the addition of hydrochloric acid or other strong acids.

After the flocculation, the precipitate can be easily separated from the brine by settling, filtration, or other mechanical means. The temperature at which the process is conducted is not critical, but is preferably between about 130°F. and 150°F. when brine from a mercury electrolytic cell is treated so that salt does not precipitate. The process can be conveniently conducted at atmospheric pressure. It has also been discovered that optimum results can be achieved when a solution such as a brine containing a large amount of mercury is mixed with a mercury-free solution containing sulfide ion and a flocculant at a ratio of from about 0.05:1 to about 1:10. A most preferred ratio is between about 1:1 to 1:4.

The following Examples will serve to illustrate the invention and its preferred embodiments. All percentages in said Examples and elsewhere in the specification are by weight unless otherwise indicated.

EXAMPLE I

To 2.0 liters of dechlorinated mercury brine having a pH of 10.95 and a temperature of 150°F. and containing 27 parts per million mercury by weight was added with agitation 20 milliliters of 0.1 normal sodium sulfide and 1.0 milliliter of (0.095 grams per milliliter) magnesium chloride at approximately 75°F. The pH of the resultant mixture was 9.17 and the mixture was filtered with suction and the filtrate analyzed and found to contain less than 100 parts per billion of mercury.

EXAMPLE II

Two liters of dechlorinated mercury brine having a pH of 10.95 were neutralized to a pH of 7.0 plus or minus 0.5, using standard HCl and sodium hydroxide. The brine was then heated to 150°F. and 20 to 35 milliliters of 0.1 normal sodium sulfide was added with stirring. Two milliliters of (0.095 grams per milliliter) magnesium chloride was then added and the pH of the mixture raised to above 10 by the addition of sodium hydroxide. The mixture was then filtered with suction and the filtrate analyzed for mercury and found to contain less than 100 parts per billion of mercury.

The following Examples demonstrate that a wide range of pH's can be employed but that the temperature of the brine is critical for optimum results in that temperatures below about 150°F. are not as effective when magnesium chloride is the flocculating compound as shown in the following Table 1.

Table 1

Effect of Temperature and pH on the Raw Brine Treatment of Mercury Cell Brine

| Example | Temperature (°F.) | pH | Mercury Analysis | Mercury Brine Source |
| --- | --- | --- | --- | --- |
| 3 | 150 | 10 | 16 ppb. | Dechlorinated (16 ppm. Hg.) |
| 4 | 120 | 10 | 0.13 ppm. | Dechlorinated (16 ppm. Hg.) |
| 5 | 120 | 9.45 | 0.16 ppm. | Treated and Filtered (8 ppm. Hg.) |
| 6 | 120 | 11.17 | 11 ppb. | Treated and Filtered (8 ppm. Hg.) |
| 7 | 150 | 9.8 | 5 ppb. | Treated and Filtered (8 ppm. Hg.) |
| 8 | 150 | 11.2 | 9 ppb. | Treated and Filtered (8 ppm. Hg.) |
| 9 | 120 | 9.5 | 0.21 ppm. | Dechlorinated (16 ppm. Hg.) |
| 10 | 120 | 11.2 | 0.12 ppm. | Dechlorinated (16 ppm. Hg.) |
| 11 | 150 | 9.2 | 22 ppb. | Dechlorinated (16 ppm. Hg.) |
| 12 | 150 | 11.2 | 7 ppb. | Dechlorinated (16 ppm. Hg.) |

The following Examples demonstrate the superior results which can be obtained by the addition of a flocculant of the invention when the brine is first neutralized to a pH of about 7.0 to decompose excess polysulfide.

To 2.0 liters of the dechlorinated mercury brine having a pH of 10.95 at 25°C. was added hydrochloric acid in an amount sufficient to neutralize the mercury brine to a pH of about 7.0. The brine was heated to 150°F. and 20 to 35 milliliters of 0.1 normal sodium sulfide was added with stirring. One to 2 milliliters of (0.095 grams per milliliter) magnesium chloride was then added. The results are reported in the following Table 2 and it can be seen that good results are achieved when the mercury brine is first neutralized to a neutral or slightly acid pH, and the sulfide and flocculating compound added before adjusting the pH to a level suitable for good flocculation.

EXAMPLE 3

Three 900 milliliter samples from a mercury electrolytic cell sewer stream containing 5,000 parts per billion mercury were treated with sodium sulfide to provide an excess of 1 part per million unreacted sulfide ion an put in 1-liter beakers with 5 cc's of 0.005 grams of copper, magnesium, or cobalt, respectively, prepared from one gram of copper nitrate trihydrate dissolved in 250 milliliters of water, 2.1 grams of magnesium chloride hexahydrate dissolved in 250 milliliters of water and 1 gram of cobalt chloride hexahydrate dissolved in 250 milliliters of water. The solutions were mixed and allowed to settle and 100 milliliter portions were decanted off after 1 hour, 4 hours, 24 hours, and 52 hours of settling time. The supernatant liquor samples were analyzed for mercury without filtering and the results are tabulated below:

| | Mercury Analyses | | | |
| --- | --- | --- | --- | --- |
| Settling Time | No Additive | Magnesium | Cobalt | Copper |
| 1 Hour | 4900 ppb. Hg. | 2380 ppb. Hg. | 2500 ppb. Hg. | 5000 ppb. Hg. |
| 4 Hours | 4580 | 1800 | 1400 | 3500 |
| 24 Hours | 2260 | 580 | 560 | 1240 |
| 52 Hours | 372 | 156 | 302 | 270 |

It can be seen from the data that magnesium, cobalt, and copper are effective flocculants for mercury sulfide.

Although the Examples are illustrated by the use of magnesium chloride, cobalt chloride, and copper nitrate, compounds of the other metals mentioned herein can be em-employed which are soluble but form insoluble hydroxides in aqueous solution.

Although the invention has been described with reference to the specific details of particular embodiments, it is not intended thereby to limit the scope of the invention except insofar as the specific details are recited in the appended claims.

I claim:

1. A process of removing soluble mercury from a brine containing more than about 5 parts per million mercury comprising:

Table 2

Effectiveness of MgCl$_2$ in the Na$_2$S Treatment of Dechlorinated Mercury Cell Brine

| | | | | | Hg Analysis | |
| --- | --- | --- | --- | --- | --- | --- |
| Example | pH Hg Brine | Ml. Na$_2$S Added | Ml. MgCl$_2$ Added | Final pH | Before Treatment | After Treatment |
| 13 | 10.95 | 20 | 1 | 9.80 | 27 ppm. | 1.4 ppm. |
| 14 | 6.45 | 20 | 1 | 9.72 | 27 ppm. | 40 ppb. |
| 15 | 7.14 | 35 | 2 | 10.90 | 27 ppm. | 0.5 ppm. | adding a 1 hundred to 5 hundred percent excess of a sulfur compound chosen from the group consisting of alkali metal sulfides, alkaline earth metal sulfides, hydrosulfides, and hydrogen sulfide, to said brine while maintaining the pH of the brine between 4 and 8;

adding a flocculant chosen from the group consisting of compounds of aluminum, magnesium, and nickel in a quantity sufficient to provide a flocculant concentration of between about 5 and 20 parts per million by weight in the brine;

adjusting the pH of the solution to convert the flocculant to an insoluble hydroxide;

maintaining the temperature of the solution between 130 and 150 degrees Fahrenheit; and thereafter recovering a brine solution containing less than one part per million mercury.

2. The method of claim 1 wherein the flocculant is magnesium chloride and the pH of the solution is adjusted to between 9 and 13.

3. The method of claim 1 wherein the flocculant is an aluminum salt and the pH of the solution is adjusted to between 4 and 8.

4. The method of claim 1 wherein the sulfur compound and the flocculant are added to the brine from a single solution having a ratio of sulfide ion to flocculant of from 1:1 to 1:4, the pH of the brine is first maintained between 4 and 8, and the pH of the brine is then adjusted to a pH where the flocculant is converted to an insoluble hydroxide.

* * * * *

UNITED STATES PATENT OFFICE
CERTIFICATE OF CORRECTION

Patent No. __3,835,217__     Dated __September 10, 1974__

Inventor(s) __Lyle H. Dunsmoor__

It is certified that error appears in the above-identified patent and that said Letters Patent are hereby corrected as shown below:

In the title "OR" should be --OF--.

At column 1, line 1, "OR" should be --OF--.

Signed and sealed this 3rd day of December 1974.

(SEAL)
Attest:

McCOY M. GIBSON JR.
Attesting Officer

C. MARSHALL DANN
Commissioner of Patents